No. 869,056. PATENTED OCT. 22, 1907.
J. E. BURTON.
DRAG ATTACHMENT FOR PLOWS.
APPLICATION FILED APR. 13, 1907.
3 SHEETS—SHEET 1.
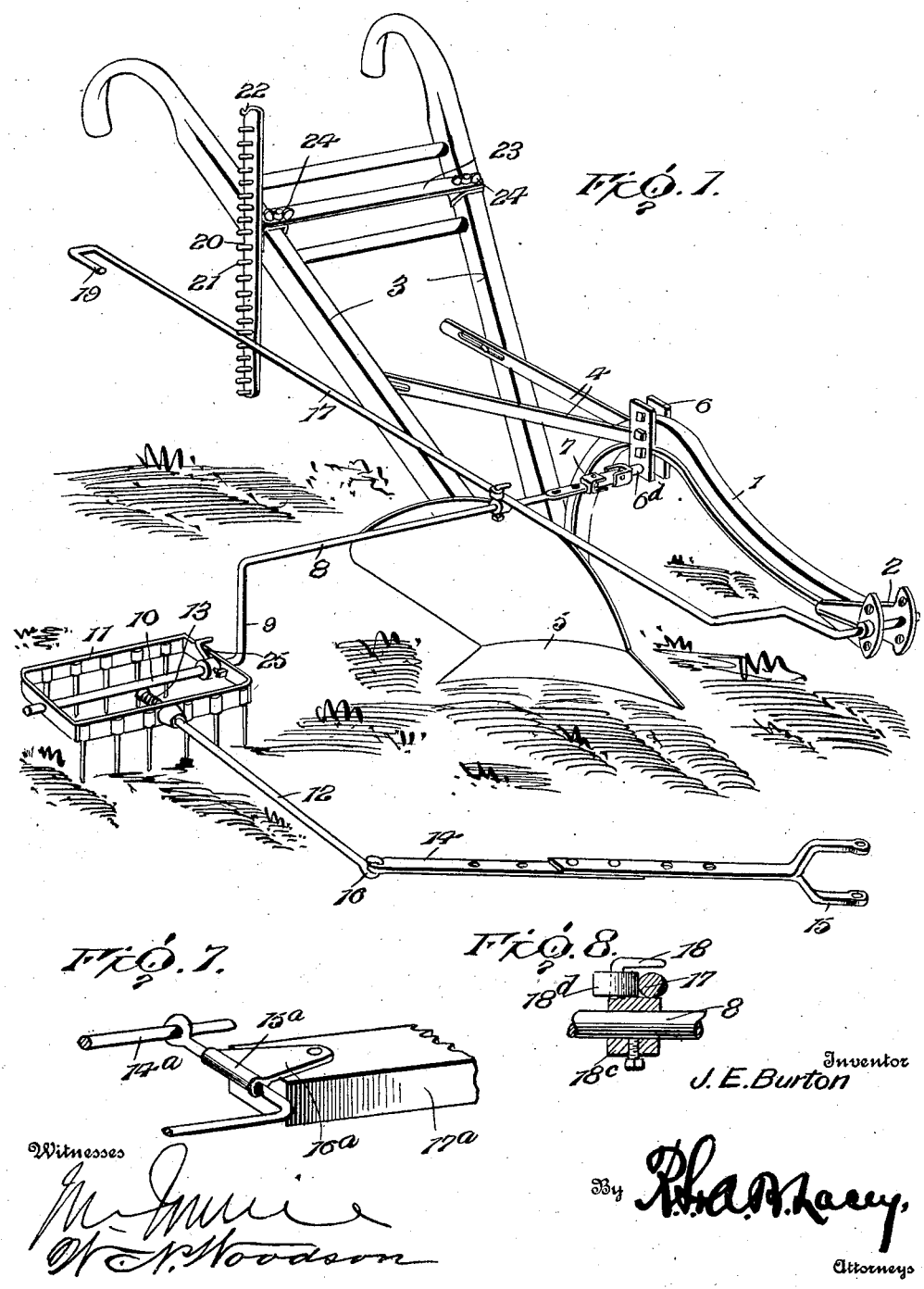
Inventor
J. E. Burton

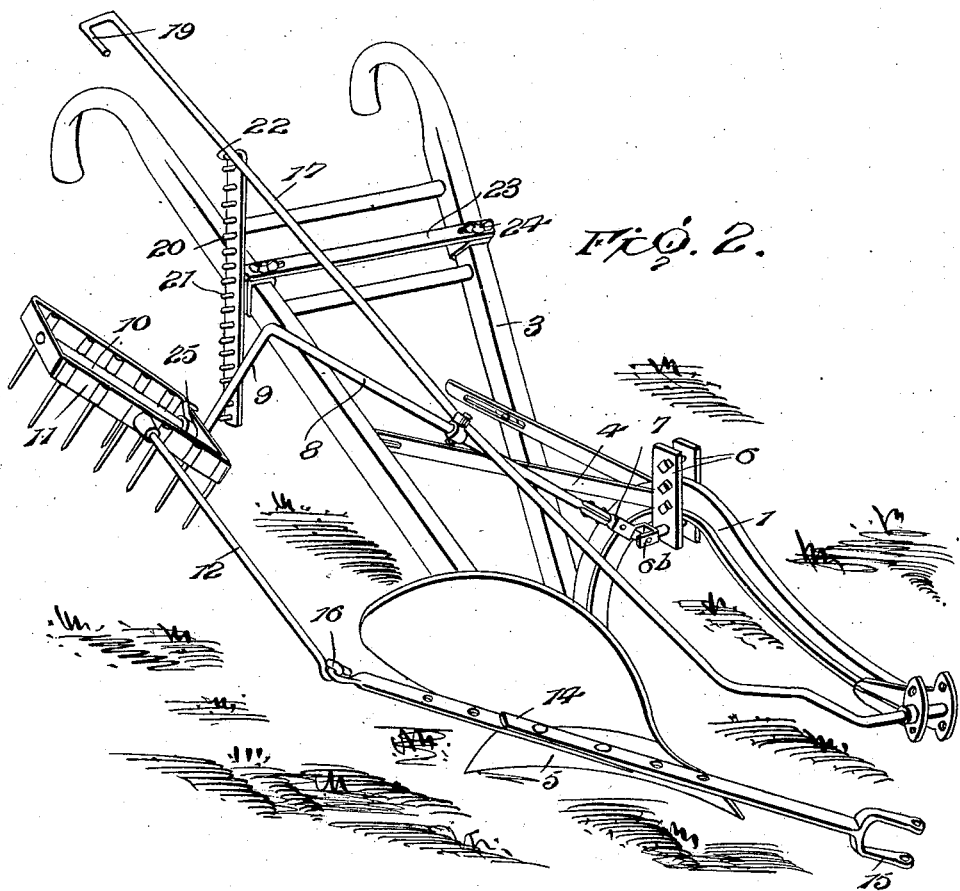

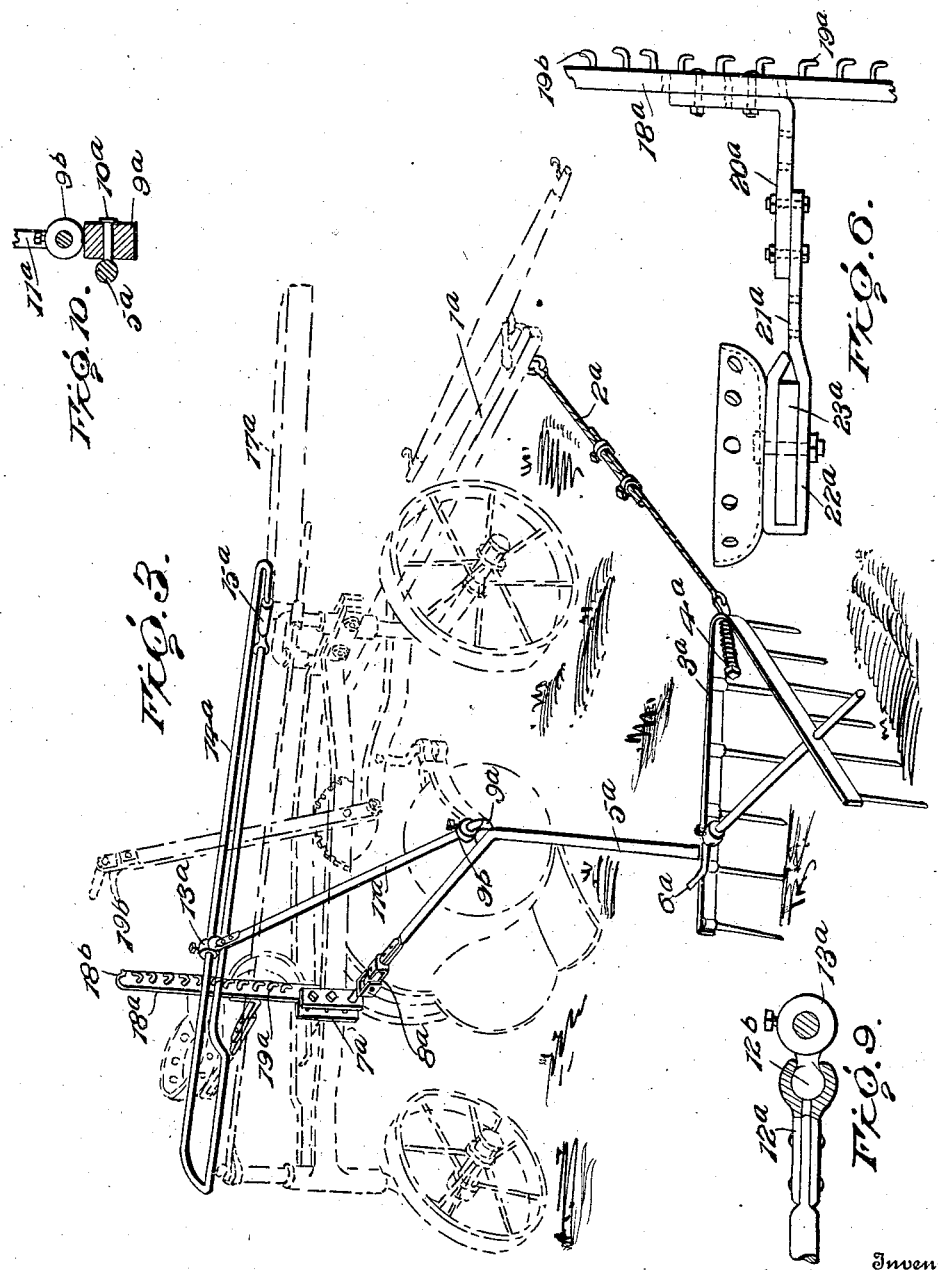

UNITED STATES PATENT OFFICE.

JAMES E. BURTON, OF WHITEWATER, WISCONSIN.

DRAG ATTACHMENT FOR PLOWS.

No. 869,056.          Specification of Letters Patent.          Patented Oct. 22, 1907.

Application filed April 13, 1907. Serial No. 368,051.

*To all whom it may concern:*

Be it known that I, JAMES E. BURTON, a citizen of the United States, residing at Whitewater, in the county of Walworth and State of Wisconsin, have invented certain new and useful Improvements in Drag Attachments for Plows, of which the following is a specification.

This invention contemplates certain new and useful improvements in drag or harrow attachments for plows, and the invention has for its object a simple, durable and efficient construction of plow attachment, by which a harrow, smoother, roller, pulverizer, or other agricultural tool or implement may be drawn along the fields with the plow, so that the subsequent operation of rolling or pulverizing the clods may be performed immediately after the ground has been plowed up and before the soil has had a chance to harden.

With this and other objects in view as will more fully appear as the description proceeds, the invention consists in certain constructions, arrangements and combinations of the parts which I shall hereinafter fully describe and then point out the novel features in the appended claims.

For a full description of the invention and the merits thereof and also to acquire a knowledge of the details of construction of the means for effecting the result, reference is to be had to the following description and accompanying drawings, in which:

Figure 1 is a perspective view of my improved drag attachment for plows, the invention being illustrated as applicable to a walking plow. Fig. 2 is a similar view with the attachment illustrated as being raised by the operator far above the ground. Fig. 3 is a perspective view of the attachment as applied to a riding plow. Fig. 4 is a detail sectional view of the two-way joint between the drag supporting rod and the plow beam. Fig. 5 is a detail sectional view, the section being taken through one of the handles and illustrating one of the parts for securing the latch bar to the handles. Fig. 6 is a rear view illustrating the manner of supporting the latch bar from the seat spring of the riding plow. Fig. 7 is a detail perspective view of the fulcrum connection between the operating lever of the attachment for the riding plow, and the tongue of the plow. Figs. 8, 9 and 10 are detail sectional views of connections hereinafter specifically referred to.

Corresponding and like parts are referred to in the following description and indicated in all the views of the drawings by the same reference characters.

Referring to the drawings, the numeral 1 designates the beam of a plow of any conventional or standard type, 2 the clevis thereof, 3 the handles, 4 the handle braces, and 5 the share.

The beam 1 is embraced by bracket plates 6, bolted thereto, one of the bolts, $6^d$, being provided with a forked end $6^b$, to which the link $6^c$ is pivotally connected to rock about a substantially horizontal axis. A fork 7 is pivotally connected to the link $6^c$ to swing about a substantially vertical axis, and a laterally extending rod 8 is secured to the fork 7 as shown. By the connection just described, it is evident that the rod 8 has a two-way or universal joint connection with the beam.

The rod 8 is formed with a downwardly extending portion 9 from which the crank end 10 extends outwardly, as clearly illustrated in the drawings.

11 designates the drag which in the present instance I have shown as a toothed harrow. The drag is pivotally mounted to swing on the crank or outwardly extending end 10 of the rod 8 and it is provided with a sleeve through which a rod 12 extends. A spring 13 encircles the rod in the rear of the sleeve of the drag and bears against the collar at the end of the rod 12 so as to provide a sufficiently yielding draft. The rod 12 forms one member of a draft device, the other member of which, designated 14, is provided with a clevis 15, adapted to be secured to a swingle tree or any form of draft evener. The member 15 is preferably constructed in overlapping sections connected together so as to be longitudinally adjustable by means of a plurality of bolts and bolt holes as shown, and said member is connected by a double loop joint 16 with the rear member 12 of the draft device.

A rod like lever 17 is fulcrumed at its front end on the plow beam, the clevis plate being used for that purpose in the present instance. The lever 17 extends rearwardly in substantially parallel relation to the beam 1, and is adapted to be engaged intermediate of its ends by a hook 18 projecting upwardly from a sleeve or collar $18^c$ mounted on the rod 8 and adapted to be adjustably held thereon by means of a set screw, as best seen in Figs. 1 and 8. The hook 18 carries a roller $18^d$ adapted to bear against the lever 17. The lever at its rear end may be formed with any desired type of handle 19 and the rear end of the lever is designed for engagement with a latch plate 20 which may be formed with a series of notches of any desired design, spaced pins 21 serving the purpose in the present instance. The lever is adapted to be inserted between any two pins so as to be held in engagement with the latch plate 20, at different elevations, and the latter is provided at its upper end with a curved seat 22 in which the lever may be held at the upper limit of its adjustment.

The latch plate 20 is held in a vertically adjustable manner on one end of a brace 23 which is adapted to extend across the plow handles and which is slotted longitudinally to receive the clamps 24 at its end, said clamps being adapted to secure the brace to the said handle at different points as desired, or according to the different widths of the handles.

25 designates a stop device which in the present instance is shown as an angular finger projecting from a set screw sleeve on the crank end 10 of the rod 8, the sleeve itself serving as a means for holding the drag on the end 10 of the rod, and the finger of said sleeve being adapted to project laterally over the inner end of the frame of the drag and in the rear of the crank rod 8, so as to limit the swinging movement or rocking of the drag on the rod when elevated.

From the foregoing description in connection with the accompanying drawings, it will be seen that I have provided a drag attachment for walking plows which may be easily attached to or detached from any conventional type of plow.

In the practical operation, after the parts have been assembled, as hereinbefore described, with the clevis 15 secured to the draft equalizer or evener, the lever 17 is manipulated and is brought to rest in engagement with the latch plate, at any desired elevation. When working, the lever will be engaged with the latch plate at a comparatively low point, according to the depth it is intended the drag or harrow shall penetrate, it being manifest that the lever 17 supports the drag through the instrumentality of the hook 18, and the crank rod 8. By means also of the hook 18 and its set screw adjustment on the rod 8, the said lever may be held securely in engagement with the latch plate 20, by pushing the sleeve 18° over towards the plow beam as far as possible, and then setting the same. In turning corners, or under similar conditions, the drag may be readily held in an elevated and inoperative position by placing the lever 11 in the seat 22. The entire attachment forms, in all practical respects a spring structure which is light as well as durable and which will yield properly to insure proper working without strain. It will be readily understood that the operator may spring the handle end of the lever 18 out of this operative position between any of the pins 21 and quickly lift the entire attachment above its normal or inoperative position, so as to pass over rocks or roots or other obstructions in working. By means of the pivot connection of the rod 8 with the plow beam 1 the rod 8 will be prevented from falling forward when forced downward by the lever 17.

Thus far, the description has had to do with my invention as embodied in walking plows. It is however, equally applicable to riding plows, although modifications of some of the parts are necessary for such application.

I shall now describe the device in connection with a plow of the riding type.

Referring to Figs. 3, 6, 7, 9 and 10, the numeral 1ª designates the whiffle tree of a riding plow to which is secured by any suitable means in a detachable manner, the front end of an extensible draft cable 2ª, preferably flexible. To the rear end of the draft cable 2ª, the drag 3ª is attached, preferably by means of a draft bolt 4ª which is encircled by a spring as shown, so as to permit the requisite amount of yielding action. The outer cranked end of a drag supporting rod 5ª passes through the side brace of the drag, which is mounted to swing thereon in a vertical plane, and a stop device or finger 6ª is secured by a set screw to the said cranked end and is adapted to extend laterally over the drag so as to limit the turning movement of the latter with respect to the rod 5ª. The inner end of the rod 5ª is connected to a bracket 7ª consisting of plates embracing and bolted to any convenient side bar of the frame work, and the connection between said bracket and the crank rod, consists of a two-way or tumbling rod joint 8ª similar to that above described in connection with the walking plow. The sleeve 9ª is mounted to turn on the finger 10ª projecting forwardly from and preferably integral with the cranked rod 5ª, said sleeve being provided with another sleeve 9ᵇ at right angles thereto and on its upper side, through which the brace 11ª extends being held therein at different adjustments by means of a set screw. The other end of the brace 11ª has a universal joint connection by socket 12ª and pawl 12ᵇ with a set screw collar 13ª on a lever 14ª. The lever 14ª comprises a frame work, embodying substantially parallel braces, and the front end of the said lever is fulcrumed within the laterally extending sleeve 15ª which is formed on a plate 16ª pivotally mounted on the rear end of the tongue 17ª, so as to permit the tongue to swing without twisting or otherwise affecting the drag attachment.

The lever 14ª is designed for engagement with a latch plate 18ª which is formed with a series of notches constructed in any manner, two series of curved pins 19ª and 19ᵇ forming the notches in the present instance. The lower set of pins points downwardly and the upper set upwardly. At its upper end the latch plate 18ª is provided with a seat 18ª in which the lever is adapted to rest when in an elevated position. The latch plate 18ª is adjustably secured to the vertically extending member of an angular bracket 20ª, the horizontal member of said bracket being adjustably connected to the arm 21ª projecting laterally from the loop 22ª. The loop 22ª is adapted to be slid over the seat spring 23ª, the seat bolt passing down through the loop so as to secure it in place, as indicated in Fig. 6.

In the operation of this embodiment of the invention, after the parts have been secured to the riding plow, the lever 14ª is connected to the latch plate 18ª underneath one of the downwardly pointing pins, so as to hold the drag 3ª at the proper depth in the soil. In turning corners or whenever desired for other reasons, the driver may raise the lever 14ª and rest it in the seat 18ᵇ, in which position it is obvious that the drag will be held slightly elevated. When traveling along the road the drag may be held still further elevated and within the line of the horses, by first loosening the sleeve or collar 9ª from the brace 11ª and sliding it along the said brace towards the lever 14ª whereupon the drag may be tilted to a high position with the rod 5ª resting upon the brace 11ª.

From the foregoing description in connection with the accompanying drawings, it will be seen that I have provided a drag attachment for both walking and riding plows that may be easily manufactured and assembled and attached to plows of any of the conventional types, the entire structure of the attachment being light and durable and not increasing the draft to any appreciable degree, and that the attachment may be easily adjusted or changed from an operative to an inoperative position whenever necessary.

Having thus described the invention, what is claimed as new is:

1. The combination with a plow, of a laterally extending rod projecting from the beam of the plow and pivotally connected thereto, a drag connected to the outer end of said rod, a draft device for said drag, a lever fulcrumed on the beam and connected intermediate of its ends with said rod, a vertically extending latch plate with which the rear end of the lever is adapted to engage, and means for securing said latch plate to the plow.

2. The combination with a plow of a rod extending laterally from the plow and having a universal joint connection therewith, a drag mounted upon the outer end of said rod, a draft connection for said drag, a lever fulcrumed on the plow and having adjustable connection with said rod, and a latch plate on the plow designed for engagement by said lever.

3. The combination with a plow, of a rod extending laterally therefrom and having a universal joint connection therewith, a drag mounted to tilt on the outer end of said rod, a stop device mounted on said rod and adapted to engage the drag to limit the tilting movement thereof on the rod, a lever fulcrumed on the plow and connected intermediate of its ends to the rod, and a latch plate on the plow adapted for engagement by said lever at different elevations.

4. The combination with a plow, of a crank rod extending laterally therefrom and having a universal connection therewith, a drag mounted on the outer end of said rod, a draft device having a yielding connection with the drag and adapted to be secured to an evener, a lever fulcrumed on the plow, and adjustably connected to said rod, and a latch plate on the plow and designed for engagement with said lever.

5. The combination with a plow, including a supporting frame work, of a depending bracket detachably connected to one side of the frame work, a rod extending laterally from the bracket and having a universal joint connection therewith, a drag supported on the outer end of said rod, a draft device for said drag, a lever fulcrumed on the plow, a vertically extending latch plate with which the lever is adapted to engage at different elevations, and a brace connecting the lever and rod and having a longitudinally adjustable connection with the latter.

6. The combination with a plow, including a supporting frame work, of a bracket detachably connected to one side of the frame work, a rod extending laterally from the bracket and having a universal joint connection therewith, a drag supported on the outer end of said rod, a draft device for said drag, a lever fulcrumed on the plow, a vertically extending latch plate with which the lever is adapted to engage at different elevations, and a brace having a longitudinally adjustable connection with the lever and a pivotally adjustable connection with the rod.

7. The combination with a plow including a supporting frame work, of a bracket detachably connected to one side of the frame work, a rod extending laterally from the bracket and having a universal joint connection therewith, a drag supported on the outer end of said rod, a draft device for said drag, a lever fulcrumed on the plow, a vertically extending latch plate with which the lever is adapted to engage at different elevations, and a brace having a pivotal connection with the lever and a longitudinally adjustable connection with the rod.

8. The combination with a plow, including a supporting frame work, of a bracket secured to one side of the frame work, a rod having a universal joint connection with said bracket, a drag supported on the end of said rod, a draft device for said drag, a frame like lever fulcrumed on the front of the plow and extending rearwardly, a brace connecting the lever with the rod, and a vertically extending latch plate supported on the plow and arranged for engagement with said lever.

9. The combination with a plow including a supporting frame work and seat spring, of a bracket secured to one side of the frame work, a rod having a jointed connection with the bracket, a drag supported on the outer end of said rod, a draft device for said drag, a lever fulcrumed on the plow, a connection between said lever and rod, a latch plate adapted to be engaged by said lever, and an arm to which said plate is secured, said arm being provided with a loop adapted to be slipped over the seat spring and held thereon.

10. The combination with a plow including a supporting frame work and seat spring, of a bracket secured to one side of the frame work, a rod having a jointed connection with the bracket, a drag supported on the outer end of said rod, a draft device for said drag, a lever fulcrumed on the plow, a connection between said lever and rod, a latch plate adapted to be engaged by said lever, and an arm with which said latch plate has a laterally adjustable connection, said arm being formed with a loop adapted to be slipped over the seat spring and held thereon.

11. The combination with a plow including a supporting frame work and seat spring, of a bracket secured to one side of the frame work, a rod having a jointed connection with the bracket, a drag supported on the outer end of said rod, a draft device for said drag, a lever fulcrumed on the plow, a connection between said lever and rod, a latch plate adapted to be engaged by said lever, an angular bracket to the vertical member of which the latch plate is adjustably connected, and an arm to which the other member of said bracket is adjustably connected, said arm being formed with a loop adapted to be slipped over the seat spring and held thereon.

In testimony whereof I affix my signature in presence of two witnesses.

JAMES E. BURTON.

Witnesses:
CLARENCE N. TROTT,
ISAAC U. WHEELER.